March 25, 1958  C. R. WOLFENDEN ET AL  2,827,804
POWER SHIFT DEVICE FOR MACHINERY
Filed Feb. 10, 1954  2 Sheets-Sheet 1

Charles Robert Wolfenden
Norman Edward Wolfenden
INVENTORS
By Richardson, David and Nordon
Their ATTYS

2,827,804
POWER SHIFT DEVICE FOR MACHINERY

Charles Robert Wolfenden and Norman Edward
Wolfenden, Braybrook, Victoria, Australia Application February 10, 1954, Serial No. 409,454

Claims priority, application Australia February 20, 1953

4 Claims. (Cl. 74—722)

This invention relates to an improved power shift device for combination woodworking machine and the like.

One object of the invention is to provide a device of this kind having simple and quickly operated means for connecting and disconnecting the drive to different tools so that the latter can be brought into use as and when required with great facility and, if desired, while the machine is running.

A further object is to provide a combination machine as above in which the tools are all arranged on the same table and the driving gear is such that both the tools can be conveniently used as required.

According to the invention, the two tools are mounted on two separate shafts with a belt driving one shaft direct and means are provided for changing the path of said belt to cause it to either engage or run clear of a pulley on the other shaft so that said other shaft may be driven or not driven as required. Preferably, one shaft is driven direct by the belt and the other or second shaft carries the other tool so that both can be driven simultaneously or the one alone driven as required.

This device broadly comprises a power shift device for driving a first shaft continuously and for predeterminedly also driving a second shaft, including a power source, a drive pulley driven thereby, a belt passing over said drive pulley, a first pulley on said first shaft and a second pulley on said second shaft, said belt passing always over said first pulley so as continuously to drive said first shaft, and means for causing said belt predeterminedly to shift so as to engage said second pulley, while still driving said first pulley.

The means for changing the path of the belt preferably comprises two free running pulleys receiving the belt and mounted on a carrier and means for rotating said carrier to change the positions of the free running pulleys. Means are also provided for locking the carrier in either of its two positions.

The invention is more fully described and ascertained aided by reference to the accompanying drawings wherein.

For illustrative purposes, the tools are considered to be a saw and a planer.

Figure 1:
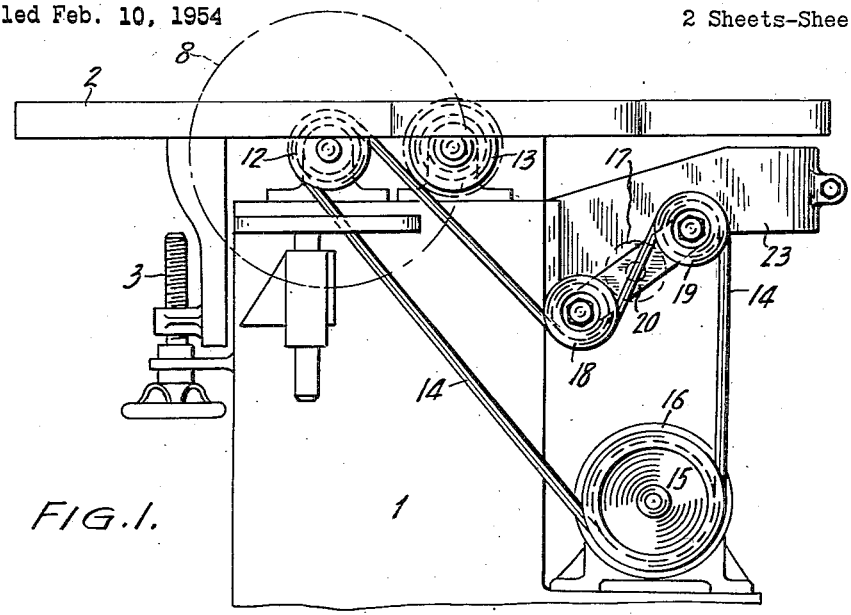
Fig. 1 is an elevational view of the improved machine.
Figure 2:
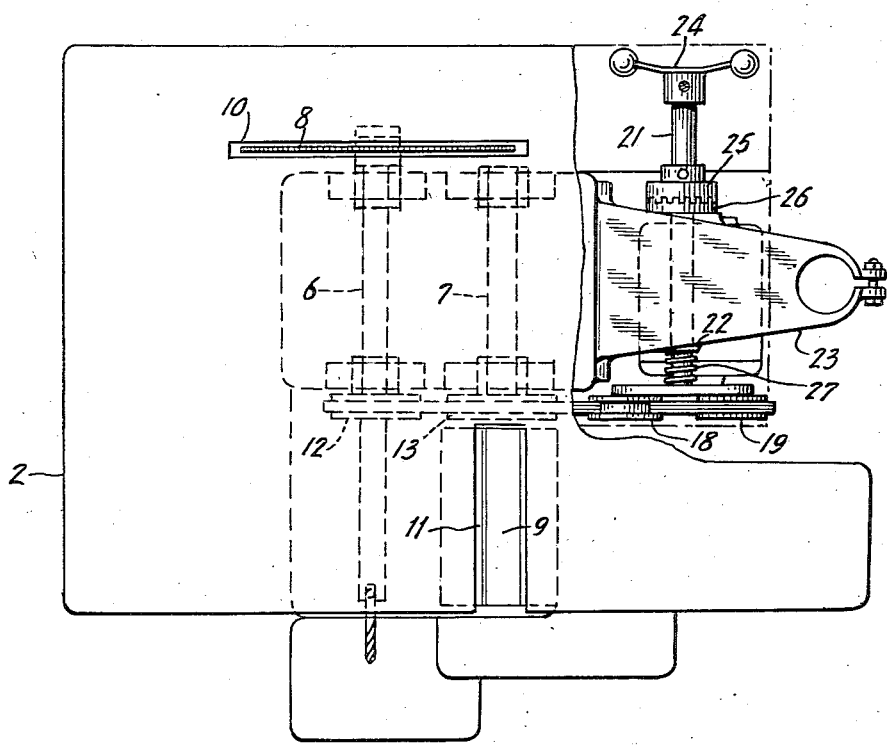
Fig. 2 is a plan view, the table of the machine being shown broken away from convenience of illustration.
Figure 3:
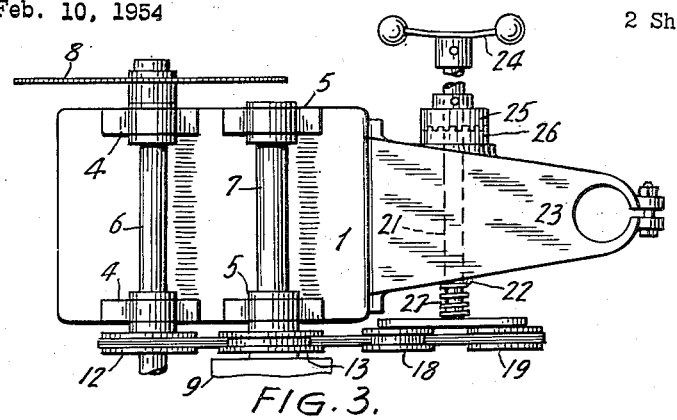
Fig. 3 is a detail plan view of the belt changing means.

As is illustrated in these views, the machine has a base 1 whereon is mounted the table 2, the latter being vertically adjustable by any suitable means such as the hand operated adjusting screw 3. This table has horizontal extensions, seen at the bottom of Fig. 2.

Supported in bearings 4 and 5 on the top of the base are two parallel shafts 6 and 7 respectively, the shaft 6 carrying the circular saw 8 and the shaft 7 the buzzer or rotary planer head 9. The saw operates on one side of the table through the saw slot 10 while the planer is arranged at the other side of the table and operates through a slot 11.

The saw shaft 6 carries a pulley 12 while the planer shaft 7 has a pulley 13. The saw shaft is driven by a belt 14 from a pulley 15 driven by an electric motor 16. The path of the belt 14 is adapted to be changed by mechanism 17 to move it either out of contact with the planer shaft pulley 13 or into contact with said pulley to drive the planer.

Said mechanism comprises two free running pulleys 18 and 19 supported by a carrier 20 mounted on a shaft 21 which extends through a bearing 22 in a rigid arm 23 and is fitted at its end with a handle as 24. The shaft 21 carries a toothed holding member 25 engageable with a complementary toothed holding boss 26 fixed on the arm 23. The shaft 21 is movable axially against a coiled return spring 27 to disengage the toothed holding member 25 from the boss 26 and permit the shaft 21 to be rotated to turn the carrier 20 and pulleys 18 and 19.

Figure 4:
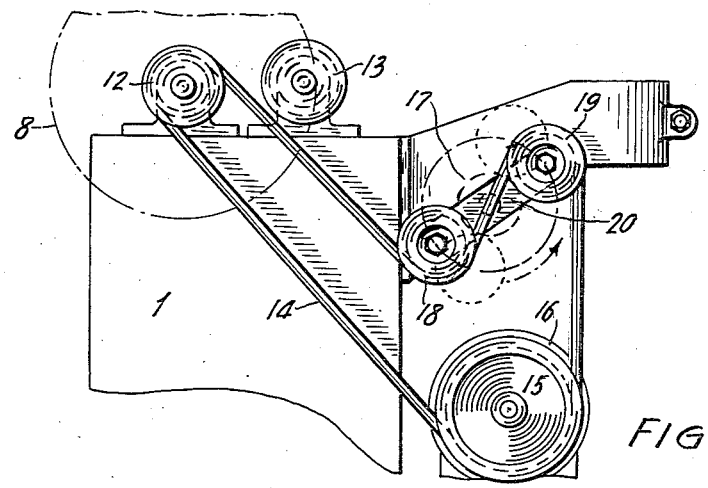
Fig. 4 is a front detail view of the drive when the planer is not being driven.

When the buzzer or rotary planer 9 is not being used, the belt changing mechanism is in the position shown in Fig. 4. In this position, the belt 14 passes under the pulley 18 and over the pulley 19 and is thus held clear of the planer shaft pulley 13 so that the saw only is driven.

Figure 5:
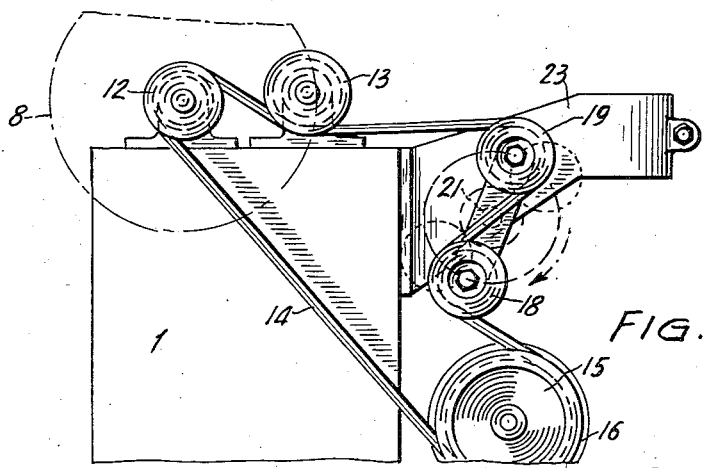
Fig. 5 is a similar view showing the drive when the planer is being driven.

To bring the planer into use, the carrier 20 is rotated by first moving the shaft 21 axially by its handle 24 against the spring 27 to disengage the toothed holding member 25 from the boss 26 and the shaft then turned approximately a full turn to move the pulleys 18 and 19 to the position shown in Fig. 5. The belt 14 then passes over the pulley 19 and under the pulley 18 so that the belt is moved into contact with the planer shaft pulley 13 to drive the rotary planer 9. The members 25 and 26 are then engaged to hold the mechanism in this position.

To again disconnect the drive to the rotary planer, the shaft 21 is released in the same manner and rotated in the reverse direction to return the pulleys 18 and 19 to the positions shown in Fig. 4.

The change can be effected very easily and rapidly as a simple movement of the handle 24 is all that is required. Moreover, the belt 14 can be tensioned or tightened as required in either driving position simply by turning the carrier to the extent required, as indicated by the arrows and dotted lines, the toothed members 25 and 26 then holding the adjustment.

The change in the drive can also be effected while the machine is running, which is important from the point of view of saving time.

The drive as described also has the advantage that it rotates the saw shaft 6 and the planer shaft 7 in opposite directions, thus, as the saw and planer are arranged on opposite sides of the common table 2, both the saw and planer are convenient for right-hand use as desired.

The arm 23 supporting the shaft 21 is rigidly secured to the base 1 of the machine and may be constructed at its outer end to support a column or pillar (not shown) associated with the trenching or docking saw attachment described in our co-pending Commonwealth patent application No. 17749/53 dated April 23, 1953.

It will be understood that, although the preferred construction is to drive the saw direct by the belt 14 and bring the planer into use as and when required, it is also possible within the ambit of the invention to re-arrange the saw and planer so that the planer is driven direct and the saw only brought into use as required by the belt changing mechanism.

What we claim is:

1. A power shift device for driving a first shaft continuously and for predeterminedly also driving a second shaft, including a power source, a drive pulley driven thereby, a belt passing over said drive pulley, a first pulley on said first shaft and a second pulley on said second shaft, said belt passing always over said first pulley so as continuously to drive said first shaft, and means for causing said belt predeterminedly to shift so as to engage said second pulley, while still driving said first pulley.

2. A device according to claim 1, said means for causing said belt to shift comprising two free running pulleys over which said belt passes, a carrier mounting said free running pulleys and means for rotating said carrier to a predetermined position so as to change the positions of said free running pulleys and thereby to engage said belt with said second pulley.

3. A device according to claim 2, also including means for locking said carrier in said predetermined position.

4. A device according to claim 3, including a third shaft upon which said carrier is mounted, said free running pulleys being mounted near the ends of said carrier, and a handle being affixed to said third shaft for rotating said carrier, said belt passing over one free running pulley in a clockwise direction and over the other free running pulley in a counter-clockwise direction, whereby the effective length of said belt remains constant upon rotation of said carrier, but the spatial position of one leg of said belt is shifted in a direction normal to the direction in which the major portion of said belt extends, so as predeterminedly to engage and to depart from said second pulley, whereby to couple and uncouple said second pulley to and from said power source.

References Cited in the file of this patent

UNITED STATES PATENTS

| | | |
|---|---|---|
| 394,594 | Murray | Dec. 18, 1888 |
| 1,479,058 | Daly | Jan. 1, 1924 |
| 1,538,524 | Synck | May 19, 1925 |
| 1,703,530 | Hume | Feb. 26, 1929 |
| 1,794,038 | Siddall | Feb. 24, 1931 |
| 2,016,528 | Wilson | Oct. 8, 1935 |